June 6, 1933.  H. S. PIERCE  1,913,288
COUPLING
Filed July 18, 1931  2 Sheets-Sheet 1
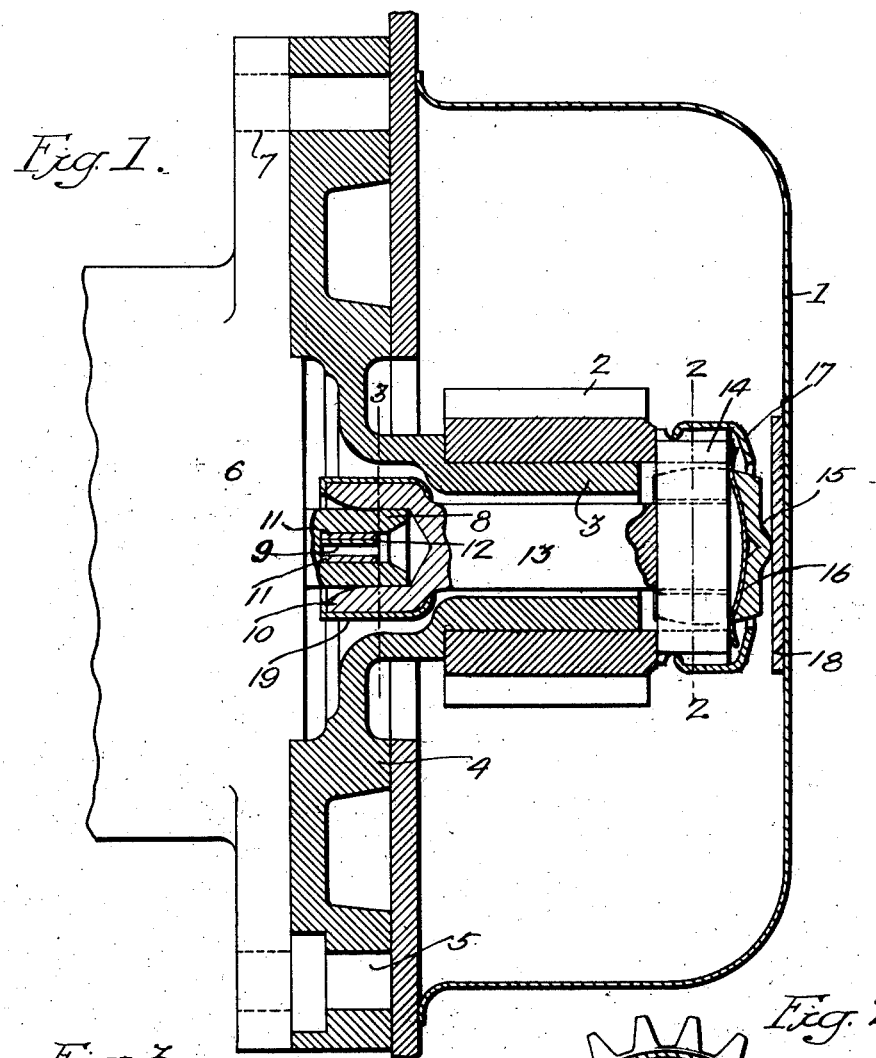
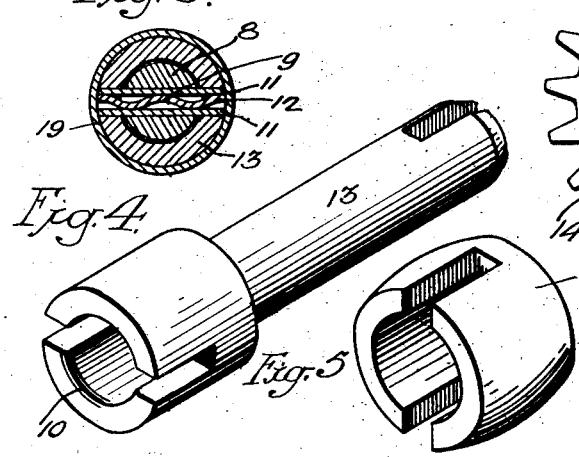
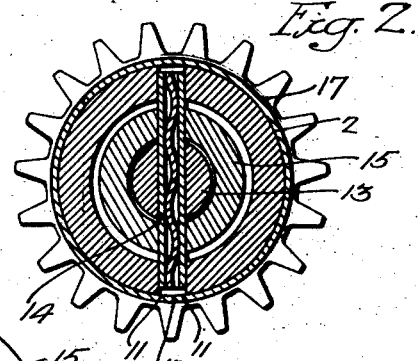
Inventor:-
Harold S. Pierce
by his Attorneys
Howson & Howson

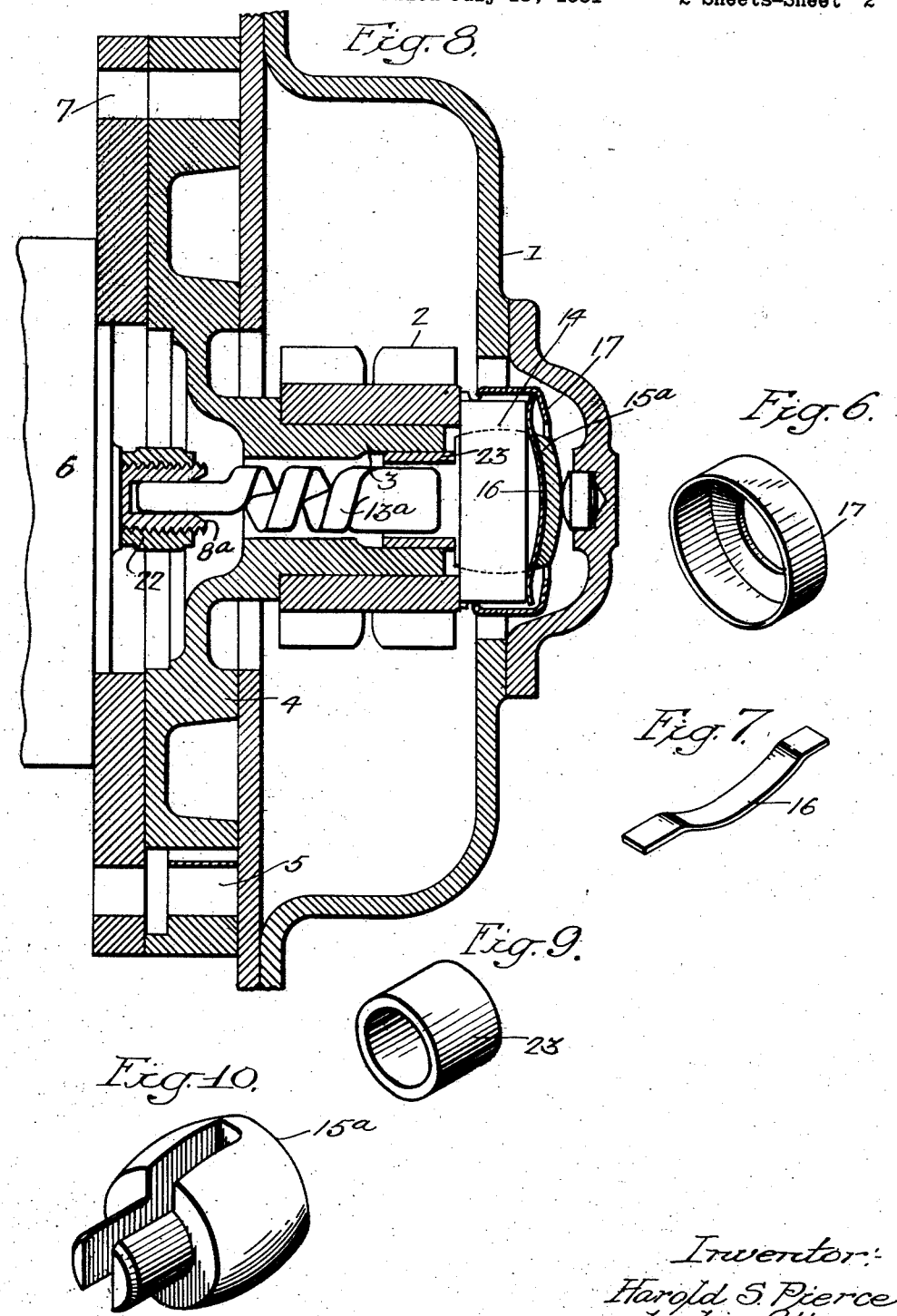

Patented June 6, 1933

1,913,288

UNITED STATES PATENT OFFICE

HAROLD S. PIERCE, OF INDIANAPOLIS, INDIANA, ASSIGNOR TO LINK-BELT COMPANY, OF CHICAGO, ILLINOIS, A CORPORATION OF ILLINOIS

COUPLING

Application filed July 18, 1931. Serial No. 551,760.

This invention relates to improvements in couplings, and relates particularly to improvements to a type of coupling adapted for connecting a sprocket or other wheel to a driven or driving shaft.

One of the objects of my invention is to provide an improved coupling of the stated type affording flexibility and a cushioning effect in the transmission between the wheel and the driving or driven shaft.

Another object of the invention is to provide an improved construction affording compensation for misalignment and other faults arising from inaccuracies in machining and assembling.

The invention further resides in certain novel structural details that render the mechanism particularly applicable to the chain drive for auxiliary parts of an internal combustion engine and to automotive construction.

In the attached drawings:

Figure 1 is a sectional view showing my improved coupling used as a connection between a sprocket wheel and a generator shaft;

Figure 2 is a section on the line 2—2, Figure 1;

Figure 3 is a section on line 3—3, Figure 1;

Figures 4, 5, 6, 7 and 10 are views in perspective of certain of the elements of the coupling;

Figure 8 is a sectional view similar to Figure 1, but illustrating a modification within the scope of the invention; and Figure 9 is a view in perspective of one of the elements of the embodiment shown in Figure 8.

With reference to the drawings, 1 is a portion of a housing which encloses a sprocket wheel 2 and a chain (not shown) which in the present instance connects the sprocket wheel with a source of power, such, for example, as the crank shaft of an automobile engine. The sprocket wheel 2 is journaled on a tubular bearing 3 which, in the present instance, is an integral part of a plate 4, this plate being suitably secured to the housing 1 by means, for example, of bolts 5. A generator 6 is secured to the plate 4 by bolts 7, and the shaft 8 of this generator projects into one end of the tubular bearing 3. The shaft 8 is slotted inwardly from its outer end for the reception of a flexible coupling element 9, which element consists in a preferred form, and as best shown in Figure 3, of a pair of flat plates 11, 11 separated by an intermediate corrugated and resilient plate 12. Also as shown in Figure 3, the member 9 projects at both ends beyond the outer surface of the shaft 8 to enter slots provided in the end of a stub shaft 13, this shaft having an enlarged hollow extremity which embraces the end of the generator shaft 8 and which contains the aforesaid slots into which the extremities of the flexible element 9 project. It will be noted, as illustrated in Figure 1 that in a preferred embodiment, the recess in the enlarged end of the stub shaft 13 which receives the generator shaft 8 is undercut and rounded at 10 to provide for minor angular misalignments of the generator and stub shafts respectively and is surrounded by the reinforcing tube 19.

The stub shaft 13, as shown in Figure 1, projects through the hollow bearing 3 and beyond the end thereof, and the outer projecting end of the stub shaft is also slotted for reception of a flexible coupling element 14, this slot being at right angles to the slots at the opposite end of the stub shaft which receive the element 9. The element 14 in construction, and as shown in Figure 2, may be similar to that previously described and designated by the reference numerals 11—12. The extremities of the element 14 project in the present instance into slots provided for their reception in the extended hub of the sprocket wheel 2, the hub extension projecting beyond the end of the bearing 3, and by means of which a resilient or flexible driving connection is afforded between the sprocket and the generator 6.

Embracing the outer end of the stub shaft 13 and projecting freely within the hub extension of the sprocket wheel 2 is a cap member 15, this member, as shown in Figure 5 being slotted for passage therethrough of the flexible element 14. A spring leaf 16 is disposed intermediate the head portion of the cap 15 and the hub of the sprocket wheel 2, the said spring extending through the said slots in the cap 15 and being bowed outwardly at its center portion to fit the correspondingly formed inner surface of the said cap, the extremities of the said spring 16 bearing against the hub extension. A cup-shaped retaining element 17 having an aperture through which the outer end of the cap 15 projects, is secured on the end of the hub of the wheel 2, the said element 17 functioning to prevent longitudinal displacement of the element 14 and of the spring 16. As illustrated in Figure 1, the outer end of the cap 15 abuts a wear plate 18 disposed inwardly of the housing 1, the said spring 16 acting to hold the cap 15 firmly against this plate.

It will be apparent from the foregoing description that the driving connection afforded by the coupling between the sprocket and the generator is a relatively flexible one. The coupling elements 9 and 14, by reason of their resilient character, afford a cushioning effect between the connected parts, and by reason of the construction and relative arrangement of the slots which hold the elements 9 and 14, it will be apparent that the coupling is rendered sufficiently flexible to compensate for minor misalignments and other errors arising from inaccuracies in machining and assembling.

The spring 16 which holds the cap 15 against the member 18, also tends, by reaction with the sprocket 2, to retain this sprocket in its proper position upon the bearing 3. The said spring 16 further compensates for minor variations in the dimensions of the casing and avoids the necessity for extreme accuracy in the machining of the immediately related parts, is centered with respect to the bearing 3 and affords a resilient control against end float and likewise effects adequate compensation for wear that may develop during operation.

It will be noted in Figs. 8 and 9 I have illustrated a modification of my invention, and with reference to the above figures I may provide a twisted flat stub shaft 13a having the end portions thereof at right angles to each other and arranged for insertion respectively in the generator shaft 8a and cap 15a.

The shaft 8a in the present instance is threaded externally for reception of a similarly threaded sleeve 22 normally retaining the end of the twisted shaft 13a in the slot in the shaft. The projecting hub of the cap 15a is embraced by a sleeve 23, effecting reinforcement of the cap and retention of the other end of the stub shaft 13a within the slot in said hub of said cap. The remaining details of construction of the disclosure in Figs. 8 and 9 is in most respects similar to that set forth above and shown in Fig. 1 of the drawings.

It will be apparent that certain other modifications and changes in the detail construction may be made except as limited by the appended claims.

I claim:

1. The combination with a tubular bearing, of a wheel journaled on said bearing and having a projecting hub portion, a shaft rotatable within the bearing, said shaft and the projecting hub of the wheel being slotted for reception of a connecting element, and a sleeve embracing the said projecting hub and preventing longitudinal displacement of the connecting member.

2. The combination with a tubular bearing, of a wheel journaled on said bearing and havng a projectng hub portion, a shaft rotatably mounted within said bearing, said shaft and the projecting hub being slotted for reception of a radial connecting element, a relatively fixed member, a spring rotatable with the shaft and with the wheel and interposed between the said hub extension and the said relatively fixed member, and a sleeve surrounding said hub extension and preventing longitudinal displacement of the said connecting member and of said spring.

3. The combination with a tubular bearing, of a wheel journaled on the bearing, a shaft rotatable within said bearing, a cap member, the said stud shaft and cap member having diametrically positioned aligned slots therein, a flexible coupling element residing in said slots, a spring disposed intermediate the end portion of the cap and the hub of the wheel, the said spring extending outwardly of the slots in the said cap, bearing against the hub of the wheel, and being bowed outwardly at its center portion to fit the correspondingly formed inner surface of the cap, a cup-shaped retaining element having an aperture centrally located therein, secured on the end of the hub of the wheel to prevent longitudinal displacement of the resilient coupling element and the spring, and a fixed member having a wear plate arranged for abutting contact by the cap.

4. The combination with a tubular bearing, of a wheel journaled thereon and having a projecting hub portion, a shaft rotatable within the bearing, means connecting said shaft and said wheel, a cap having a slot therein embracing said shaft and said connecting means, a spring extending diametrically through the slot of the cap and engaging said hub, a relatively fixed member, and a second cap embracing said hub to prevent displacement of the connecting means, the said second cap having an opening centrally therein to permit the first mentioned cap to abut against the relatively fixed member and cooperate with the spring to maintain the wheel properly upon the bearing.

5. The combination with a tubular bearing, of a wheel journaled thereon and having a projecting hub portion having slots therein, a shaft rotatable within the bearing, a slotted cap having a reduced concentric projecting portion arranged to embrace the outer end of the shaft, said slotted cap also being arranged to receive a connecting element which in turn engages the slots in the hub portion, and a cap embracing said hub portion preventing displacement of said connecting member.

6. The combination with a tubular bearing, of a wheel journaled thereon and having a projecting hub portion having slots therein, a shaft rotatable within the bearing, a slotted cap having a reduced concentric projecting portion arranged to embrace the outer end of the shaft, said slotted cap also being arranged to receive a connecting element which in turn engages the slots in the hub portion, a cap embracing said hub portion preventing displacement of said connecting member, a relatively fixed member, and a spring rotatable with the shaft and the wheel and interposed between the hub portion and said relatively fixed member to maintain the parts of the combination in their respective positions.

HAROLD S. PIERCE.